United States Patent Office 3,382,299
Patented May 7, 1968

3,382,299
TETRA PHOSPHITE OF PENTAERYTHRITOL-
LOWER ALKYLENE OXIDE ADDUCTS
Millard S. Larrison, Livingston, N.J., assignor to Weston
Chemical Corporation, Newark, N.J., a corporation of
New Jersey
No Drawing. Filed July 13, 1965, Ser. No. 471,712
10 Claims. (Cl. 260—929)

ABSTRACT OF THE DISCLOSURE

Compounds are prepared having the formula

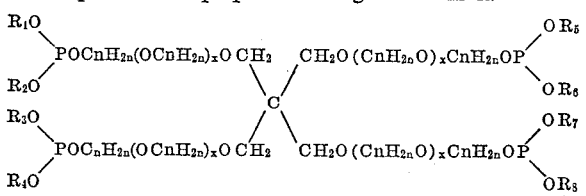

where $R_1$, $R_2$, $R_3$, $R_4$, $R_5$, $R_6$, $R_7$ and $R_8$ are selected from the group consisting of hydrocarbyl and haloaryl, $x$ is selected from the group consisting of zero and a positive integer and $n$ is a small positive integer of at least 2.

---

This invention relates to the preparation of phosphite esters.

It is an object of the present invention to prepare novel phosphite esters.

Another object is to prepare phosphite esters having good thermal stability.

A further object is to prepare phosphite esters having excellent hydrolytic stability.

An additional object is to impart improved stability to polymers.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing phosphites having the formula:

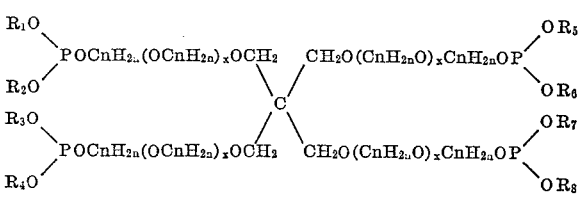

where $R_1$, $R_2$, $R_3$, $R_4$, $R_5$, $R_6$, $R_7$ and $R_8$ are hydrocarbyl or haloaryl, e.g. alkyl, carbocyclic aryl or halophenyl, $x$ is zero or a positive number, e.g. 1, 2, 3, 4, 5 or 7.75 and $n$ is a small integer of above 1, e.g. 2, 3, or 4.

The compounds are conveniently prepared by reacting a pentaerythritol-lower alkylene oxide adduct with a trialkyl phosphite, a triaryl phosphite, a trihaloaryl phosphite, and aryldialkyl phosphite or a diaryl alkyl phosphite or a mixture of such phosphites in the presence of a catalyst. Sometimes it is more convenient to use a mixture of a triaryl phosphite of a low boiling phenol with either a high boiling phenol or high boiling alcohol to form the phosphite of the high boiling phenol or alcohol.

As the starting phosphite there can be used alkyl, aryl and haloaryl phosphites such as trimethyl phosphite, triethyl phosphite, tripropyl phosphite, triamyl phosphite, tris octyl phosphite, tris isooctyl phosphite, tris decyl phosphite, tris isodecyl phosphite, tris octadecyl phosphite, tris dodecyl phosphite, triphenyl phosphite, tri-o-cresyl phosphite, tri-p-cresyl phosphite, tri-m-cresyl phosphite, trixylenyl phosphite, triethylphenyl phosphite, tributyl-phenyl phosphite, tri-p-chlorophenyl phosphite, tri-o-chlorophenyl phosphite, tri 2,4-dichlorophenyl phosphite, tri-2,4,5-trichlorophenyl phosphite, tri - 2,4,6 - trichlorophenyl phosphite, tri-p-bromophenyl phosphite, tripentachlorophenyl phosphite, phenyl diisodecyl phosphite, diphenyl decyl phosphite, tri-α-naphthyl phosphite, o-cresyl dioctadecyl phosphite, m-cresyl dioctyl phosphite, di-p-cresyl hexyl phosphite, tridodecylphenyl phosphite.

As the high boiling alcohol or phenol which can be used with a triaryl phosphite of a relatively low boiling phenol, there can be used octylphenol, nonyl phenol, t-octyl phenol, dodecyl phenol, pentachlorophenol, pentabromophenol, butyl phenol, decyl alcohol, isodecyl alcohol, dodecyl alcohol, octyl alcohol, octadecyl alcohol, eicosanyl alcohol.

As the catalyst there can be used a dihydrocarbon phosphite or an alkaline catalyst in an amount of 0.05–5% by weight of the trihydrocarbyl or trihaloaryl phosphite reactant. Thus as catalysts there can be used dialkyl or diaryl phosphites such as diphenyl phosphite, di-o-cresyl phosphite, di-p-cresyl phosphite, didecyl phosphite, diisodecyl phosphite, dioctadecyl phosphite, dimethyl phosphite, diethyl phosphite or dihalohydrocarbyl phosphites such as di-o-chlorophenyl phosphite, di-2,4-dichlorophenyl phosphite or alkaline catalysts such as sodium phenolate, sodium methylate, sodium cresylate, potassium phenolate, sodium isodecylate. The alkaline catalysts preferably have a pH of at least 11 in an 0.1 N solution.

As the pentaerythritol-lower alkylene oxide adduct there can be employed tetrols which are the adducts of pentaerythritol with alkylene oxides such as ethylene oxide, propylene oxide, trimethylene oxide, 1,2-butylene oxide, 1,3-butylene oxide and 1,4-butylene oxide. Such adducts have molecular weights of 312 to 1000 or more, e.g. 1500. The preferred adducts are the pentaerythritol-propylene oxide adducts having molecular weights of about 400 to 600. It will be observed where an ethylene oxide adduct has a molecular weight of 1500, the average number of ethylene oxide units attached to each original methylol group of the pentaerythritol is 7.75.

It is important that there be used at least 4 moles of the tertiary phosphite per mole of pentaerythritol-propylene oxide adduct to insure that the reaction product does not contain reactive hydroxyl groups of the type which occur when there is employed for example 3 moles of the adduct to one mole of the tertiary phosphite as in Friedman Patents 3,081,331 and 3,142,651. The free hydroxyl groups as in the compounds disclosed in the Friedman patents are reactive and for certain stabilizer uses are undesired.

The compounds of the present invention within Formula I are useful as stabilizers for vinyl chloride resins, e.g. polyvinyl chloride, vinylchloride-vinyl acetate copolymer (87:13), vinyl chloride-vinylidene chloride (95:5), vinyl chloride-acrylonitrile (80:20). They are also useful as stabilizers for olefin polymers, e.g. polymers of monoolefins such as polyethylene, polypropylene, ethylene copolymers with monoolefins having 3–10 carbon atoms, e.g. ethylene propylene copolymer (50:50; 80:20; 20:80), ethylene-butene-1 copolymer, ethylene-isobutylene copolymer, ethylene-hexene-1 copolymer and ethylene decene-1 copolymer; ethylene-propylene-cyclopentadiene terpolymer (70:25:5); polyolefin polymers, e.g. natural rubber, butadiene-styrene copolymer (SBR rubber), cis isoprene polymer, etc. The compounds of the invention are used in an amount of 0.1–10% by weight of the polymer when employed as thermal or oxidation stabilizers.

Unless otherwise indicated, all parts and percentages are by weight.

Examples of compounds within the present invention are octa-isodecyl pentaerythritol-propylene oxide molecular weight 400 tetraphosphite,
octaphenyl pentaerythritol-propylene oxide molecular weight 400 tetraphosphite,
octakis (p-nonyl phenyl) pentaerythritol-propylene oxide molecular weight 400 tetraphosphite;
tetraoctyl tetraphenyl pentaerythritol-propylene oxide molecular weight 400 tetraphosphite;
hexyl hepta(p-cresyl)pentaerythritol-propylene oxide molecular weight 400 tetraphosphite;
octakis(pentachlorophenyl) pentaerythritol-propylene oxide molecular weight 400 tetraphosphite;
octakis(pentabromophenyl)pentaerythritol-propylene oxide molecular weight 400 tetraphosphite,
octakis (p-chlorophenyl) pentaerythritol-propylene oxide molecular weight 400 tetraphosphite,
octakis (o-octylphenyl) pentaerythritol-propylene oxide molecular weight 400 tetraphosphite;
octakis (p-dodecylphenyl) pentaerythritol-propylene oxide molecular weight 400 phosphite;
octakis octadecyl-pentaerythritol-propylene oxide molecular weight 400 tetraphosphite,
octamethyl pentaerythritol-propylene oxide molecular weight 400 tetraphosphite,
octaethyl pentaerythritol-propylene oxide molecular weight 400 tetraphosphite,
octaisooctyl pentaerythritol-propylene oxide molecular weight 400 tetraphosphite,
octakis dodecyl pentaerythritol-propylene oxide molecular weight 400 tetraphosphite,
octakis (2,4,5-trichlorophenyl) pentaerythritol-propylene oxide molecular weight 400 tetraphosphite,
octakis (2,4,6-trichlorophenyl) pentaerythritol-propylene oxide molecular weight 400 tetraphosphite,
octakis (2,4,6-tribromophenyl) pentaerythritol-propylene oxide molecular weight 400 tetraphosphite,
octakis (o-nonylphenyl) pentaerythritol-propylene oxide molecular weight 600 tetraphosphite,
octakis decyl pentaerythritol-propylene oxide molecular weight 600 tetraphosphite,
octaphenyl pentaerythritol-propylene oxide molecular weight 600 tetraphosphite,
octakis (pentachlorophenyl) pentaerythritol-propylene oxide molecular weight 600 tetraphosphite,
octakis (p-nonylphenyl) pentaerythritol-propylene oxide molecular weight 450 tetraphosphite,
octa-isodecyl pentaerythritol-propylene oxide molecular weight 450 tetraphosphite,
octaphenyl pentaerythritol-propylene oxide molecular weight 450 tetraphosphite,
octaphenyl pentaerythritol-propylene oxide molecular weight 750 tetraphosphite,
octakis nonyl pentaerythritol-propylene oxide molecular weight 1000 tetraphosphite,
octaphenyl pentaerythritol-propylene oxide molecular weight 1500 tetraphosphite,
octaisodecyl pentaerythritol-ethylene oxide molecular weight 350 tetraphosphite,
octaphenyl pentaerythritol-ethylene oxide molecular weight 400 tetraphosphite,
octakis (m-nonylphenyl) pentaerythritol-ethylene oxide molecular weight 1000 tetraphosphite,
octaphenyl pentaerythritol-1,4-butylene oxide molecular weight 450 tetraphosphite,
octakis (p-nonylphenyl pentaerythritol-1,4-butylene oxide molecular weight 550 tetraphosphite,
octaisodecyl pentaerythritol-1,4-butylene oxide tetraphosphite, octaphenyl pentaerythritol-1,2-butylene oxide molecular weight 450 tetraphosphite,
octakis (p-decylphenyl) pentaerythritol-1,3-butylene oxide molecular weight 450 tetraphosphite,
octaphenyl pentaerythritol-trimethylene oxide molecular weight 400 tetraphosphite.

As used in the specification and claims, the term "pentaerythritol-propylene oxide molecular weight 400," for example, means that the pentaerythritol-propylene oxide adduct used to form the tetraphosphite had an average molecular weight of about 400.

PEP 450 is a commercially available pentaerythritol-propylene oxide adduct having a molecular weight of about 400 and a hydroxy number of 558.

EXAMPLE 1

200 grams (0.5 mole) of PEP 450, 620 grams (2 moles) of triphenyl phosphite, 632 grams (4.2 moles) of isodecyl alcohol and 15 grams of diphenyl phosphite were mixed and subjected to vacuum distillation under a packed column to facilitate removal of phenol. During distillation an additional 56 grams of isodecyl alcohol were added to replace that removed with the phenol. A total of 550 grams of phenol (theory, 564 grams) were removed. Terminal conditions were 193° C. and 10 torr. The distillation residue was treated with 10 grams of dry soda ash and 10 grams of filter aid and filtered. The filtrate was octa isodecyl pentaerythritol-propylene oxide molecular weight 400 tetraphosphite (octa isodecyl PEP 450 tetraphosphite), a water white, mobile liquid having a refractive index at 25° C. of 1.4657; specific gravity at 25° C. of 0.953 and an acid value of 0.3. It was thermally and hydrolytically stable and was useful in stabilizing polyvinyl chloride and other polymers as set forth above. Thus it can be used in an amount of 3 parts with 100 parts of polyvinyl chloride.

EXAMPLE 2

50 grams of PEP 450, 229 grams of tris (p-nonylphenyl) phosphite, 52 grams of triphenyl phosphite and 4 grams of diphenyl phosphite (catalyst) were mixed and subjected to vacuum distillation. Terminal conditions were 173° C. and 10 torr. A total of 46 grams of phenol (98% of theory) were removed. The distillation residue was treated with 2.5 grams of soda ash and 2.5 grams of filter aid and filtered. The filtrate was octakis (nonylphenyl) pentaerytritol-propylene oxide molecular weight 400 tetraphosphite, was a light yellow liquid of medium viscosity having a refractive index at 25° C. of 1.5244.

EXAMPLE 3

100 grams of PEP 450, 310 grams of triphenyl phosphite and 4 grams of diphenyl phosphite were mixed and subjected to vacuum distillation. A total of 72 parts of phenol (76.5% of theory) were removed. Terminal conditions were 149° C. and 10 torr. The octaphenyl pentaerythritol-propylene oxide molecular weight 400 tetraphosphite was a clear viscous liquid which formed a gel-like structure on cooling to room temperature (20–25° C.).

EXAMPLE 4

200 grams of PEP 450, 620 grams of triphenyl phosphite, 3300 grams of pentachlorophenol and 15 grams of diphenyl phosphite were mixed and subjected to vacuum distillation until 552 grams of phenol were removed. The distillation residue was octakis(pentachlorophenyl)pentaerythritol-propylene oxide molecular weight 400 tetraphosphite.

EXAMPLE 5

The procedure of Example 1 was repeated but using 2.7 moles of triphenyl phosphite and only 2.1 moles of isodecyl alcohol to produce a product which was a mixture of compounds averaging tetra-isodecyl tetraphenyl pentaerythritol-propylene oxide molecular weight 400 tetraphosphite.

What is claimed is:

1. 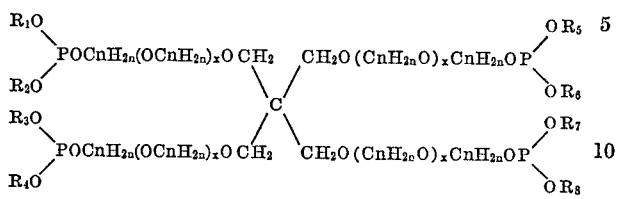

where $R_1$, $R_2$, $R_3$, $R_4$, $R_5$, $R_6$, $R_7$ and $R_8$ are selected from the group consisting of alkyl, phenyl, alkyl phenyl, naphthyl, chlorophenyl and bromophenyl, $x$ is selected from the group consisting of zero and a positive number up to 7.75 and $n$ is an integer from 2 to 4.

2. A compound according to claim 1 wherein $n$ is 3.

3. Octaalkyl pentaerythritol-propylene oxide molecular weight 400 to 600 tetraphosphite.

4. Octaphenyl pentaerythritol-propylene oxide molecular weight 400 to 600 tetraphosphite.

5. Octa(alkylphenyl)pentaerythritol - propylene oxide molecular weight 400 to 600 tetraphosphite.

6. A compound according to claim 5 wherein the alkyl of the alkylphenyl has 8 to 12 carbon atoms.

7. Octakis(polychlorophenyl)pentaerythritol - propylene oxide molecular weight 400 to 600 tetraphosphite.

8. Octakis(nonylphenyl)pentaerythritol - propylene oxide molecular weight 400 tetraphosphite.

9. Octaisodecyl pentaerythritol-propylene oxide molecular weight 400 tetraphosphite.

10. Octaphenyl pentaerythritol-propylene oxide molecular weight 400 tetraphosphite.

References Cited

UNITED STATES PATENTS 3,047,608    7/1962    Friedman et al. __ 260—929 XR

CHARLES B. PARKER, *Primary Examiner.*

A. H. SUTTO, *Assistant Examiner.*